ANTHONY SLUTHOUR. Rotary Pumps.

No. 4,802. Reissued March 12, 1872.

Witnesses:- W. H. Rowe
A. Moore

Anthony Sluthour
by his Atty.
Wm. D. Baldwin

AM. PHOTO-LITHOGRAPHIC CO. N.Y. (OSBORNE'S PROCESS.)

UNITED STATES PATENT OFFICE.

ANTHONY SLUTHOUR, OF NEW PHILADELPHIA, OHIO.

IMPROVEMENT IN ROTARY PUMPS.

Specification forming part of Letters Patent No. 102,057, dated April 19, 1870; reissue No. 4,802, dated March 12, 1872.

*To all whom it may concern:*

Be it known that I, ANTHONY SLUTHOUR, formerly of Cleveland, in the county of Cuyahoga and State of Ohio, but now residing at New Philadelphia, in the county of Tuscarawas and State aforesaid, have invented certain new and useful Improvements in Pumps, of which the following is a specification:

My invention relates to both lift and force pumps of that class having oscillating pistons. I believe that pumps of this class will do a given amount of work with less power than those of any other construction: but, so far as my knowledge extends, all oscillating pumps constructed prior to the date of my invention have failed of practical success from various defects of construction. Now, the object of my invention is to obviate the objections incident to oscillating pumps as constructed prior to my invention, and to render them efficient in operation. The subject-matter claimed is fully specified hereinafter.

Figure 1:
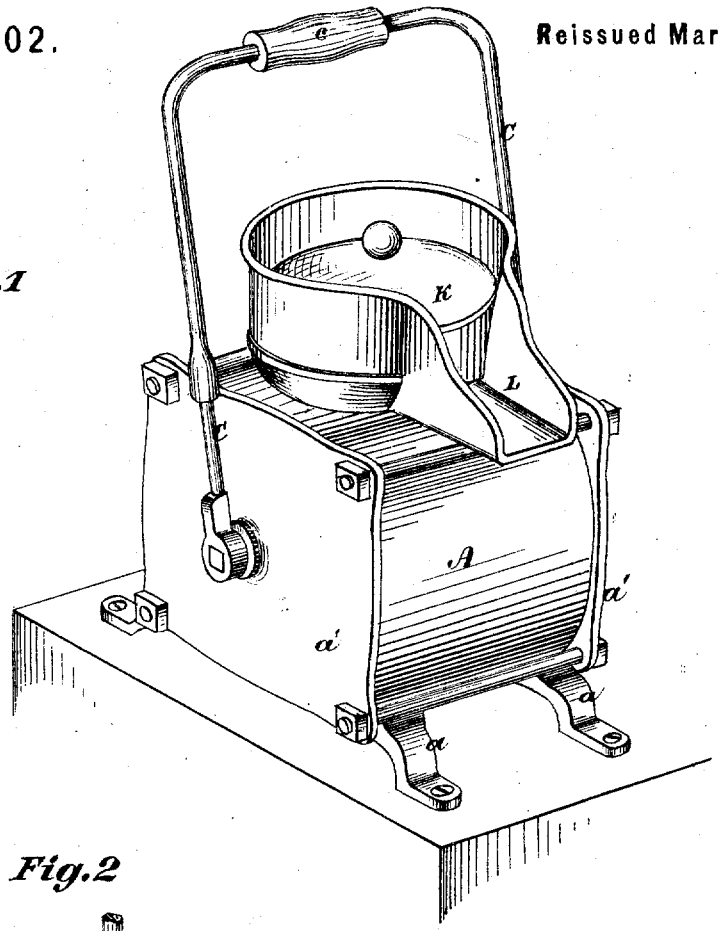
Figure 2:
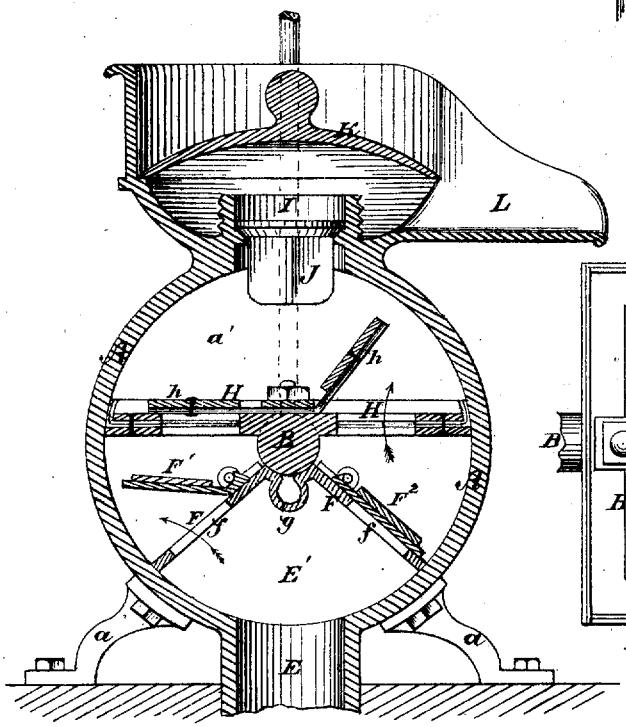
Figure 3:
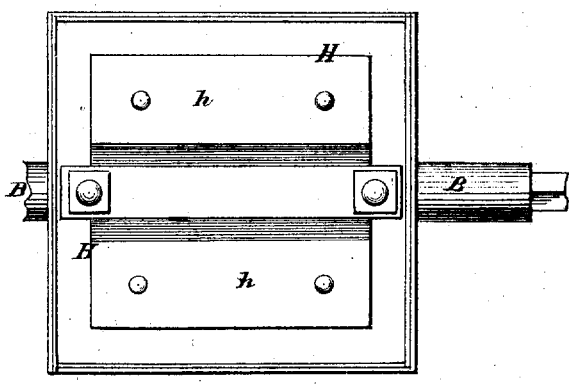

In the accompanying drawing, Figure 1 represents a view, in perspective, of a lift-pump in which all my improvements are embodied. Fig. 2 represents a vertical section through the same, and Fig. 3 represents a plan view of the piston detached.

In this instance a cylinder, A, is shown as mounted on suitable legs *a*, and as having proper heads *a'*, provided with stuffing-boxes, through which the piston-shaft B projects. The ends of this shaft are, by preference, made polygonal for the better attachment of a lever or bail, C, which latter is provided with a loose sleeve, *c*, to prevent friction on the hands of the workman. An induction-pipe, E, opens into the induction-chamber E' of the cylinder. The walls of this chamber are composed of longitudinal channel-plates F, which converge at their inner ends and are united by a connecting-piece, in which a longitudinal groove, *g*, is formed. The inner edges of the channel-plates abut against this connecting-piece and the piston-shaft in such manner that the water forced into the groove *g* in working the pump serves as a packing to prevent water being forced from one compartment of the cylinder to the other. The openings *f* of the channel-plates are covered by flap-valves $F^1$ $F^2$, pivoted to the channel-plates. A piston, H, is fixed upon and oscillates with or around the shaft B. The valves *h* of this piston are likewise connected to the piston, above the shaft B. The edges of the piston may be provided with cup-leathers, and the stuffing-boxes may likewise be packed, if desired; but if the parts be properly fitted all packing may be dispensed with save that hereinbefore mentioned between the compartments. An eduction-pipe, I, leads from the discharge-chamber. This pipe may be provided with a suitable valve, J, which keeps the pump primed by retaining water therein. By lifting this valve the discharge-valves may be lifted, and the cylinder thus emptied to prevent freezing. This valve J, however, is not essential to the working of the pump, but acts beneficially in preventing priming. A hood or cap, K, may be used to prevent the water from spirting too high, and a discharge-spout or trough, L, may be used to carry off the water.

By removing the cap and attaching a hose the apparatus may be used as a force-pump without other change.

In operation the piston is oscillated by the application of suitable power. As the discharge-valve on one side rises, water flows through the corresponding delivery-valve and through the opposite discharge-valve, this operation being reversed at each stroke of the pump, as is well understood.

I claim as my invention—

1. The combination of the oscillating piston, eduction-pipe, and hood, substantially as set forth.

2. The combination of the oscillating piston, the eduction-pipe, the valve in said pipe, and the hood, substantially as hereinbefore set forth.

ANTHONY SLUTHOUR.

Witnesses:

W. H. ROME,

BALTIS DE LONG.